US008032942B2

(12) United States Patent
Smith et al.

(10) Patent No.: US 8,032,942 B2
(45) Date of Patent: Oct. 4, 2011

(54) CONFIGURATION OF VIRTUAL TRUSTED PLATFORM MODULE

(75) Inventors: Ned Smith, Beaverton, OR (US);
Willard Wiseman, Tigard, OR (US);
Alok Kumar, Santa Clara, CA (US);
Tasneem Brutch, Cornelius, OR (US);
Vincent Scarlata, Beaverton, OR (US);
Faraz Siddiqi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 11/967,300

(22) Filed: Dec. 31, 2007

(65) Prior Publication Data

US 2009/0169017 A1 Jul. 2, 2009

(51) Int. Cl.
*H04L 9/00* (2006.01)
*H04L 9/32* (2006.01)
*G06F 7/04* (2006.01)

(52) U.S. Cl. .............. 726/27; 726/28; 726/29; 726/30; 713/187; 713/188; 713/189; 713/190; 713/194

(58) Field of Classification Search ...................... 726/27
See application file for complete search history.

(56) References Cited

U.S. PATENT DOCUMENTS

| | | | |
|---|---|---|---|
| 7,103,771 B2 | 9/2006 | Grawrock | |
| 2005/0246552 A1* | 11/2005 | Bade et al. | 713/193 |
| 2007/0006175 A1 | 1/2007 | Durham et al. | |

OTHER PUBLICATIONS

Smith, Ned M. et al. "Methods and Apparatus for Providing Upgradeable Key Bindings for Trusted Platform Modules" United States Patent Application filed Sep. 27, 2007, U.S. Appl. No. 11/863,233.
Smith, Ned M. et al. "Methods and Apparatus for Creating an Isolated Partition for a Virtual Trusted Platform Module" United States Patent Application filed Aug. 10, 2007; U.S. Appl. No. 11/837,378.
Smith, Ned M. et al. "Device, System, and Method for Provisioning Trusted Platform Module Policies to a Virtual Machine Monitor" United States Patent Application filed Nov. 15, 2007; U.S. Appl. No. 11/984,321.
Brutch, Tasneem et al. "Virtual TPM Keys Rooted in a Hardwared TPM" United States Patent Application filed Sep. 28, 2007; U.S. Appl. No. 11/864,512.
Brutch, Tasneem et al. "Method and Apparatus for Allowing Access to Hardware TPM to a Trusted Virtual Machine When the TPM Is Virtualized" United States Patent Application filed Dec. 21, 2007; U.S. Appl. No. 11/963,336.
Smith, Ned M. "Method and Apparatus for Virtualization of a Multi-Context Hardware Trusted Platform Module (TPM)" United States Patent Application filed Aug. 22, 2007; U.S. Appl. No. 11/894,915.

* cited by examiner

*Primary Examiner* — Longbit Chai
(74) *Attorney, Agent, or Firm* — Trop, Pruner & Hu, P.C.

(57) ABSTRACT

Systems, methods and machine readable media for configuring virtual platform modules are disclosed. One method includes launching a virtual machine monitor, and determining, with the virtual machine monitor, whether a configuration policy that defines a configuration for a virtual trusted platform module is trusted. The method further includes configuring the virtual trusted platform module per the configuration policy in response to the virtual machine monitor determining that the configuration policy is trusted. The method also includes launching, via the virtual machine monitor, a virtual machine associated with the virtual trusted platform module.

18 Claims, 3 Drawing Sheets

CONFIGURATION OF VIRTUAL TRUSTED PLATFORM MODULE

BACKGROUND

A trusted platform may demonstrate that it operates in a safe configuration by measuring the configuration and sealing the data to the configuration. A key component of a trusted platform is the trusted platform module (TPM). A TPM may perform operations such as cryptographic hashes to detect loss of integrity, public and secret key encryption to prevent unauthorized disclosure of data, and digital signing to authenticate transmitted information. Additional details on trusted platform modules may be found in specifications such as the Trusted Computing Group (TCG) TPM Specifications Version 1.2, Level 2 Revision 103, published 9 Jul. 2007 (hereinafter the "TPM specifications").

The measurements of a configuration may be hashed and stored in platform configuration registers (PCRs) of a TPM. A trusted platform may allow access to data only under a particular configuration of the trusted platform. The TPM seal operation may encrypt data to a specific set of PCR values or an authorization value. To unseal the data, and thereby gain access to it, the authorization must be presented and the set of values stored in the PCRs must match the set used in the seal operation. Similarly, a signing key may be locked to a set of PCR values during key generation within the TPM.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
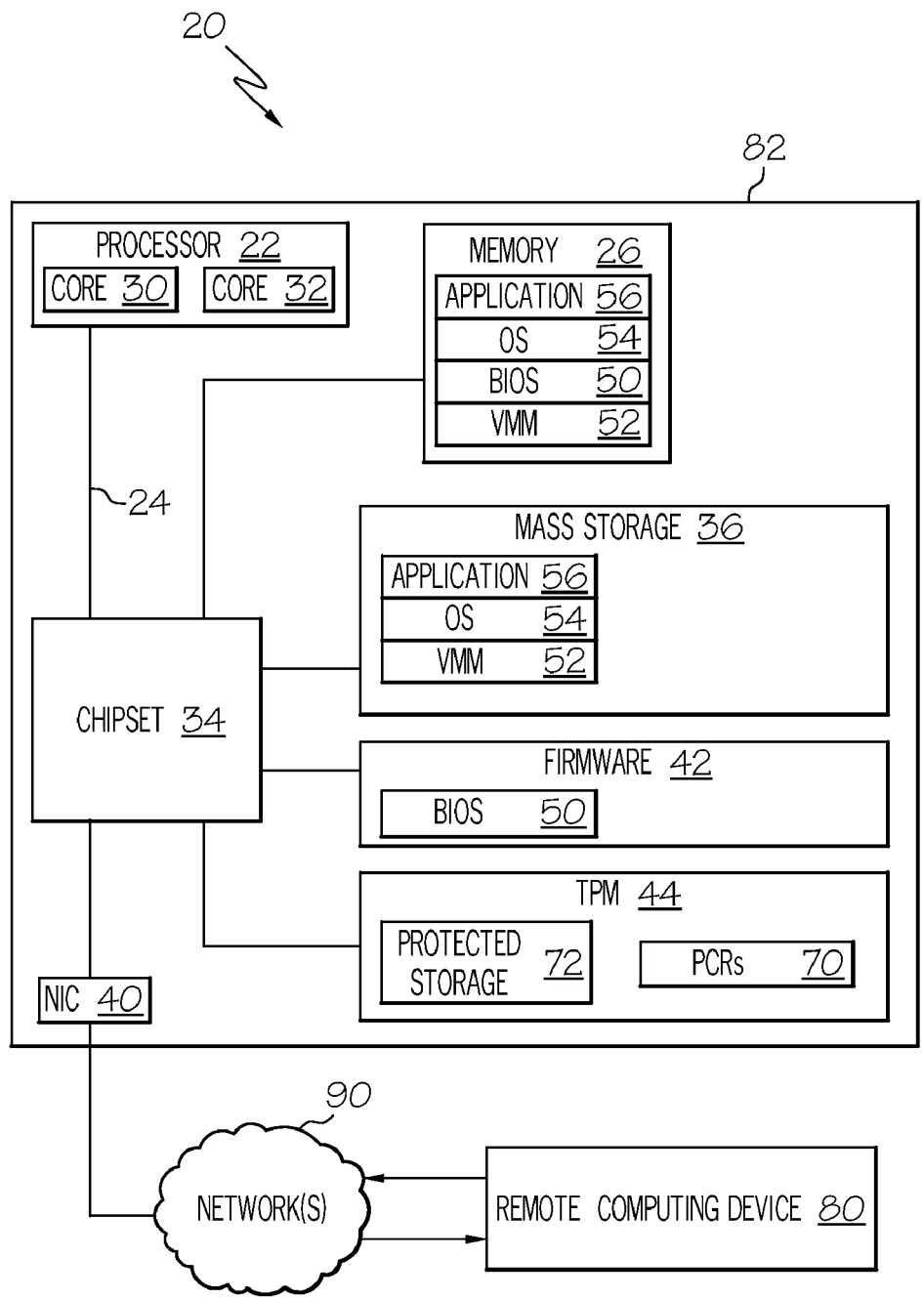
FIG. 1 shows an embodiment of a computing device having a hardware trusted platform module and a virtual machine monitor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a computing device 20 is shown. The computing device 20 includes various hardware components 82, such as a processor 22, communicatively coupled to various other components via one or more system buses 24 or other communication pathways or mediums. For example, the processor 22 may be communicatively coupled to one or more volatile or nonvolatile data storage devices such as memory 26, firmware device 42, and mass storage devices 36. Suitable storage devices may include, without limitation, hard disk drives, floppy disk drives, optical disk drives, tapes, flash memory, memory sticks, digital video disks, phase change memory (PCM), etc. The processor 22 may also be communicatively coupled to one or more network interface controllers (NICs) 40, video controllers, integrated drive electronics (IDE) controllers, small computer system interface (SCSI) controllers, universal serial bus (USB) controllers, input/output (I/O) ports, input devices, output devices such as a display, etc.

As shown, the processor 22 may include one or more processing cores 30, 32. Alternatively, a computing device 20 may include a single processor 22 with a single processing core 30, or multiple processors 22 that each have at least one processing core 30. Moreover, one or more processing cores 30, 32 may provide multithreading support technologies such simultaneous multithreading (SMT), thus enabling each processing core 30, 32 to execute multiple threads simultaneously or substantially simultaneously.

The computing device 20 may also include a hardware trusted platform module (TPM) 44. The hardware TPM 44 may include control logic, platform configuration registers (PCR) 70, and protected storage 72. The hardware TPM 44 may (a) store a measurement of the system configuration (e.g., a hash of the system configuration) in PCRs 70, (b)

provide verified evidence of the system configuration (e.g., a signed configuration measurement), and (c) restrict access to protected digital keys, based at least in part on whether a current system configuration matches a predetermined approved configuration. The hardware TPM 44 may be implemented as a discrete module that is communicatively coupled to the processor 110 via a chipset 34 or other intermediate modules. Alternatively, some or all of the control logic, PCRs 70, and protected storage 72 of a trusted platform module 44 may be implemented as part of one or more other components (e.g., a NIC, an I/O controller, an I/O hub, a processor, etc.). In the embodiment of FIG. 1, the hardware TPM 44 is shown as a discrete module that is communicatively coupled to processor 22 via chipset 34. The chipset 34 may include one or more bridges or hubs for communicatively coupling system components, as well as other logic and storage components.

The computing device 20 may be controlled, at least in part, by input from conventional input devices, such as a keyboard, a mouse, etc., and/or by directives received from another machine, biometric feedback, or other input sources or signals. The computing device 20 may utilize one or more connections to one or more remote computing devices 80, such as through NIC 40, a modem, or other communication ports or couplings. The computing devices 20, 80 may be interconnected to form a data processing environment through use of a physical and/or logical network 90, such as a local area network (LAN), a wide area network (WAN), an intranet, the Internet, etc. Communications involving the network 90 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

The firmware device 42 may store Basic Input/Output System (BIOS) code 50. Furthermore, the mass storage 36 may store a virtual machine monitor (VMM) or hypervisor 52, one or more operating systems (OS) 54, and one or more applications 56. The computing device 20 may transfer instructions of the BIOS code 50, virtual machine monitor 52, operating systems 54, and applications 56 to the memory 26 and execute such instructions with the processor 22.

Figure 2:
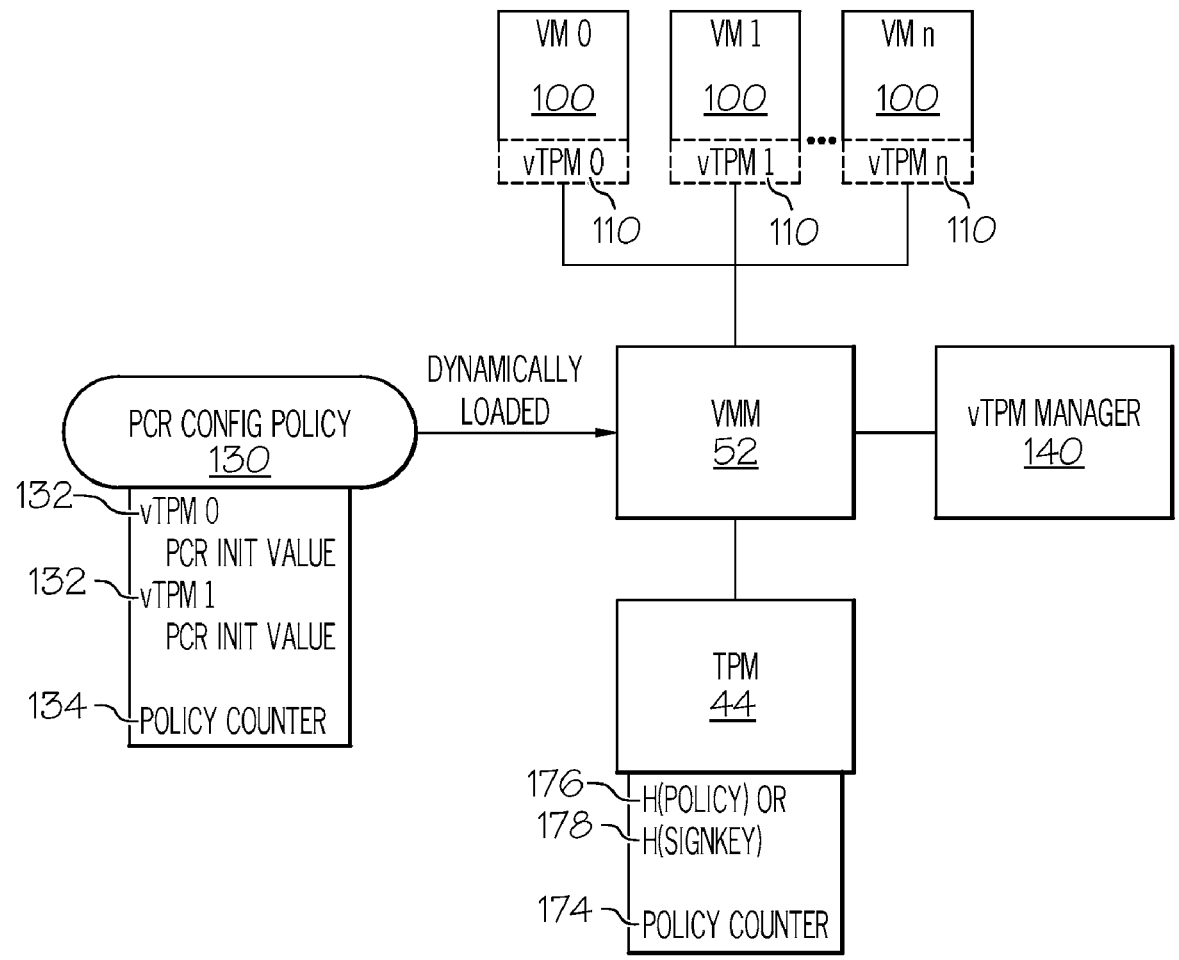
FIG. 2 shows an embodiment of the virtual machine monitor of FIG. 1 and virtual trusted platform modules which the virtual machine monitor configures and presents to the virtual machines of the computing device.

The processor 22 may execute the BIOS code 50 to initialize the computing device 20 and invoke execution of the virtual machine monitor 52. The processor 22 may execute the BIOS code 50 in response to a system reset, system power-up, or some other triggering event. The processor 22 in response to executing the virtual machine monitor 52 may establish one or more virtual machines (VM) 100 as shown in FIG. 2 and may boot an operating system 54 in each established virtual machine 100. Moreover, the virtual machine monitor 52 may configure a virtual trusted platform module (vTPM) 110 for each virtual machine 100. The computing device 20 may further generate measurements of various hardware and software components of the computing device 20 and may extend PCRs 70 of the hardware TPM 44 based upon the measurements. As a result of extending the values stored by the hardware TPM 44, the PCRs 70 of the hardware TPM 44 may contain values that express the real environment of the computing device 20. However, the virtual machines 100 may define a virtual environment that does not correspond to the real environment of the computing device 20.

As a simplified example, the real environment may comprise a multi-core processor 110 and the PCRs 70 of the hardware TPM 44 may reflect that the real environment has a multi-core processor 110. A virtual machine 100, however, may define a virtual environment that presents a virtual single core processor to an operating system 54 that does not properly handle multi-core processors. Thus, while the values of the hardware TPM 44 may properly reflect the real environment that has a multi-core processor, the values of the hardware TPM 44 do not properly reflect the virtual environment that has a single core processor. As such, the computing device 20 may refuse to execute the operating system 54 in the established virtual environment despite the virtual machine 100 presenting a single core processor to the operating system 54 since the values of the hardware TPM 44 are not consistent with a single core processor environment.

Similarly, the computing device 20 may refuse to execute an application 56 in a virtual environment despite the virtual environment providing a suitable environment for the application since the hardware environment reflected by the hardware TPM 44 does not correspond to the expected trusted environment. Further, the computing device 20 may refuse to unseal data while operating in a virtual environment despite the virtual environment providing a suitable environment since the hardware environment reflected by the hardware TPM 44 does not correspond to the expected trusted environment.

In order to support such usages of virtual environments, the computing device 20 may provide virtual trusted platform modules (TPM) 110 as shown in FIG. 2 which may be configured to reflect the virtual environment provided by a corresponding virtual machine 100. In general, the virtual machine monitor 52 may load a configuration policy 130 that specifies the configuration of the virtual TPMs 110 and may initialize or otherwise configure corresponding virtual TPMs 110 per the loaded configuration policy 130. Furthermore, the computing device 20 may include a virtual trusted platform (vTPM) manager 140 to manage context switches between virtual trusted platform modules 110 on behalf of the virtual machines 100. Further details regarding configuration of the virtual TPMs 110 per the configuration policy 130 are provided in reference to the flowchart of FIG. 3.

Figure 3:
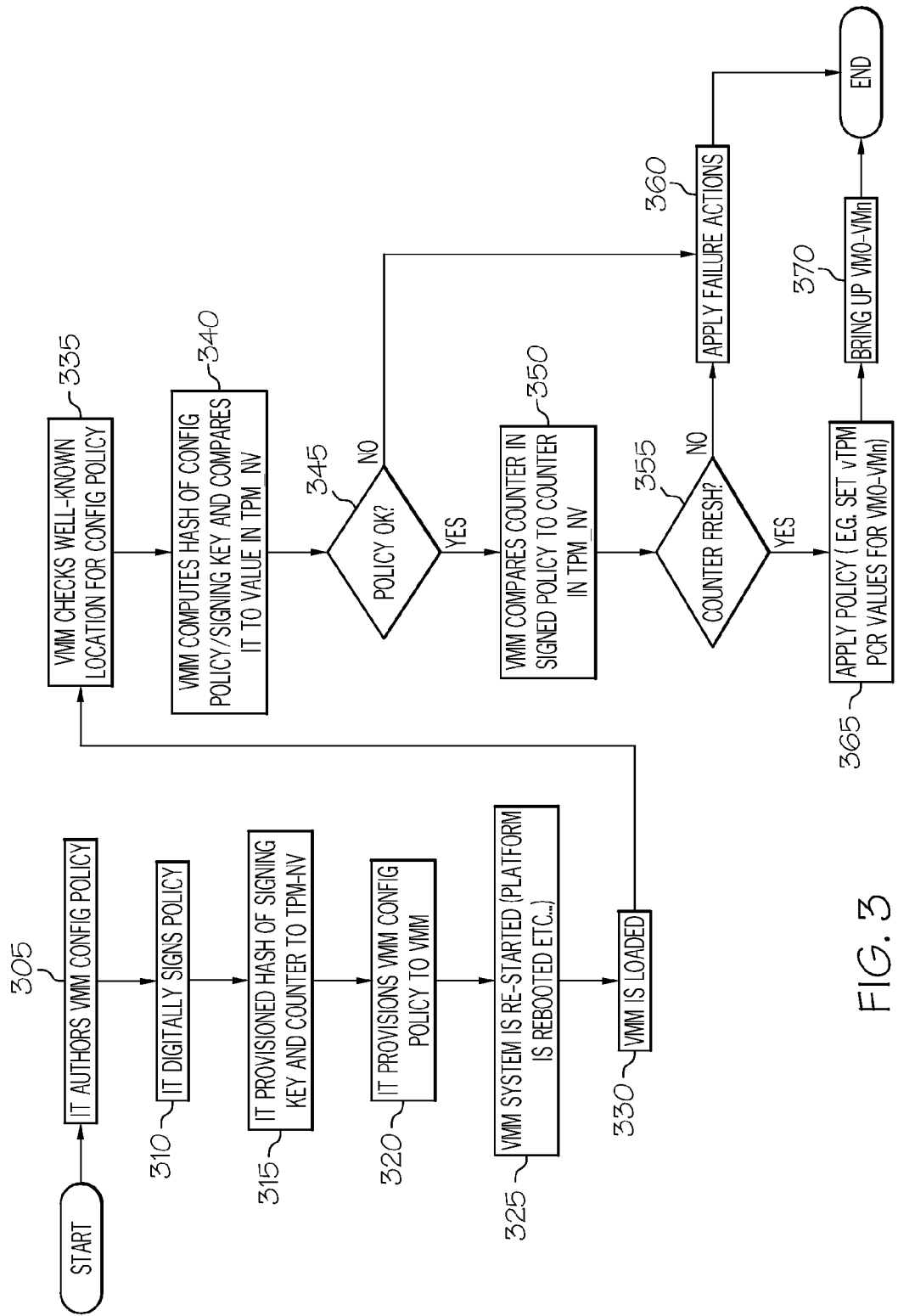
FIG. 3 shows an embodiment of a process of defining a configuration policy for the virtual trusted platform modules and configuring the virtual trusted platform modules per the configuration policy.

In particular, as shown in FIG. 3, an information technology (IT) professional may author the configuration policy 130 at block 310. In one embodiment, the IT professional may use a policy authoring tool to define directives 132 that initialize virtual PCRs of the virtual TPMs 110 and to define a counter value or version number 134 for the configuration policy 130.

In another embodiment, the IT professional may simply use a generic text editor to author the directives 132 and counter value 134 of the configuration policy 130. Regardless of whether the IT professional uses a policy authoring tool or a text editor, the IT professional may provide the configuration policy 110 with a counter value or version number 134 that is greater than counter values of previous configuration policies signed by the IT professional or that is otherwise unique from counter values of previous counter policies signed by the IT professional.

Moreover, the IT professional may incorporate various types of directives 132 into the configuration policy 130 that specify the initial configuration of the virtual TPMs 110. For example, the IT professional may use a directive that specifies an explicit value for one or more virtual PCRs of the virtual TPMs 110. The IT professional may use a directive that specifies contents of a particular hardware PCR 70 is to be copied to a particular virtual PCR. The IT professional may use a directive that specifies that the computing device 20 is to take a snapshot of a virtual TPM 110 associated with one virtual machine 100 and copy values of the snapshot to a virtual TPM 110 of another virtual machine 100. Another directive may instruct the computing device 20 to measure the virtual machine monitor 52 and to extend specified virtual PCRs with the obtained measurement of the virtual machine monitor 52. A directive may specify that a virtual PCR is to be set to zero (0). Yet another directive may specify that a virtual PCR is to be capped which in one embodiment sets the virtual PCR to negative 1 (−1).

At block 310, the IT professional may digitally sign the configuration policy 130 using a private key of an asymmetric key pair. Accordingly, a computing device may later use the public key of the asymmetric key pair to authenticate the signed configuration policy 130. To support such authentication of the signed configuration policy 130, the IT professional at block 315 may provision the counter value 174 of the configuration policy 130 and a hash 176 of the configuration policy 130 to the protected storage 72 of the hardware TPM 44. The IT professional may instead at block 315 provision the public key or a cryptographic hash 178 of the public key to the protected storage 72.

At block 320, the IT professional may provision the signed configuration policy 130 to the virtual machine monitor 52. In particular, the IT professional may store the configuration policy 130 on the mass storage device 36 at a location known to the virtual machine monitor 52 and/or may provide the virtual machine monitor 52 with the location of the configuration policy 130. Moreover, the IT professional at block 325 may restart the virtual machine monitor 52 and/or the computing device 20 so that the configuration policy 130 can take effect.

In one embodiment, the IT professional may remotely provision the key, counter value 174 and/or hash values 176, 178 to protected storage 72 of the hardware TPM 44 at blocks 315, 320 and may remotely restart the virtual machine monitor 52 at block 325. In particular, the IT professional may use the remote computing device 80 and remote management capabilities of the computing device 20 such as management capabilities provided by Intel® Active Manageability Technology (AMT) to accomplish these tasks.

In response to being restarted, the computing device 20 at block 330 may initialize hardware and software components, may measure such hardware and software components, may store such measurements in PCRs of the hardware TPM 44, and may load the virtual machine monitor 52. At block 335, the virtual machine monitor may retrieve the configuration policy 130. As mentioned above, the configuration policy 130 may be stored at a location known to the virtual machine monitor 52 and/or the virtual machine monitor 52 may be previously configured (e.g. block 320) with the location of the configuration policy 130.

At block 340, the virtual machine monitor 52 may compute hash values of the configuration policy 130 and/or the public key and compare such computed values to the hash values 176, 178 stored in the protected storage of the hardware TPM 44. In particular, the virtual machine monitor 52 may hash the configuration policy 130 to obtained a computed hash value and may compare the computed hash value to the stored hash value 176. Furthermore, the virtual machine monitor 52 may retrieve the public key from the mass storage device 36, may compute the hash value of the retrieved public key, and compare the computed hash value with the stored hash value 178 for the public key.

The virtual machine monitor 52 at block 345 may determine whether the configuration policy 130 is authentic based upon the comparisons of the computed hash values and stored hash values 176, 178. In particular, the virtual machine monitor 52 may determine that the configuration policy 130 is authentic in response to the computed hash value of the configuration policy 130 matching the stored hash value 176 for the configuration policy 130. In another embodiment, the virtual machine monitor 52 may determine that the configuration policy 130 is authentic in response to the computed hash value of the public key matching the hash value 178 stored in the hardware TPM 44, and successfully verifying the signature of the configuration policy.

In response to determining that the configuration policy 130 is authentic, the virtual machine monitor 52 at block 350 may compare the counter value 134 of the configuration policy 130 to the counter value 174 stored in the hardware TPM 44. At block 355, the virtual machine monitor 52 may determine that the configuration policy 130 is current or fresh if the counter value 134 of the configuration policy 130 matches the counter value 174 of the hardware TPM 44. If the virtual machine monitor 52 determines that the configuration policy 130 is either not authentic or not fresh, then the virtual machine monitor 52 at block 360 may take one or more failure actions. For example, the virtual machine monitor 52 may refuse to launch virtual machines 100, may launch virtual machines 100 in a safe mode having limited capabilities, power down the computing device 20, and/or some other action.

In response to determining that the configuration policy 130 is authentic and fresh, the virtual machine monitor 52 may establish virtual TPMs 110 and initialize such virtual TPMs 110 via the directives of the configuration policy 130. In particular, the virtual machine monitor 52 may set one or more virtual PCRs of the virtual TPMs 110 to values provided by the configuration policy 130. The virtual machine monitor 52 may copy values from PCRs 70 of the hardware TPM 44 to PCRs of the virtual TPMs 110 per directives of the configuration policy 130. The virtual machine monitor 52 may take a snapshot of a virtual TPM 110 associated with a running virtual machine 100 and copy values of the snapshot to a virtual TPM 110 of another virtual machine 100 per directives of the configuration policy 130. The virtual machine monitor 52 may cause specified PCRs of the virtual TPMs 110 to be extended with a measurement of the virtual machine monitor 52 in response to a directive of the configuration policy 110. A directive may further cause the virtual machine monitor 52 to set a PCR of the virtual TPMs 110 to zero (0). Yet another directive may cause the virtual machinem monitor 52 to cap a PCR of the virtual TPMs 110 by setting such PCRs to negative 1 (−1).

Finally at 370, the virtual machine monitor 52 may launch virtual machines 100 and provide each virtual machine 100 with their respective virtual TPM 110. In this manner, each virtual machine 100 may provide a virtual environment that differs from the real environment. Furthermore, each virtual machine 100 may have a virtual TPM 110 that accurately reflects its virtual environment instead of the real environment of the computing device 20.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A non-transitory machine readable storage medium comprising:
   a plurality of instructions that, in response to being executed by a processor, result in a computing device to perform the functions of:
   determining whether a configuration policy for a virtual trusted platform module associated with a virtual machine is trusted, including retrieving a hash value of the configuration policy from non-volatile storage of a hardware trusted platform module, computing a hash value of the configuration policy, and determining that the configuration policy is trusted in response to the retrieved hash value corresponding to the computed hash value, determining whether the configuration policy is current, including retrieving from the non-volatile storage a version number for the configuration policy, and determining that the configuration policy is current in response to the retrieved version number matching a version number of the configuration policy, the version number unique from version numbers of previous configuration policies, configuring the virtual trusted platform module associated with the virtual machine per the configuration policy in response to determining that the configuration policy is trusted and current; and launching, via a virtual machine monitor, the virtual machine associated with said virtual trusted platform module.

2. The machine readable medium of claim 1 wherein the plurality of instructions, in response to being executed, further result in the computing device retrieving, from the non-volatile storage, a public key that corresponds to a trusted private key, and determining to trust the configuration policy in response to determining based upon the retrieved public key that the configuration policy was signed using the trusted private key.

3. The machine readable medium of claim 1 wherein the plurality of instructions, in response to being executed, further result in the computing device setting virtual platform configuration register values of the virtual trusted platform module per directives of the configuration policy.

4. The machine readable medium of claim 1 wherein the plurality of instructions, in response to being executed, further result in the computing device setting, per the configuration policy, a virtual platform configuration register of the virtual trusted platform module to a value specified by the configuration policy.

5. The machine readable medium of claim 1 wherein the plurality of instructions, in response to being executed, further result in the computing device setting, per the configuration policy, virtual platform configuration values of the virtual trusted platform module to a copy of a snapshot taken of virtual platform configuration register values associated with a running virtual machine.

6. The machine readable medium of claim 1 wherein the plurality of instructions, in response to being executed, further result in the computing device per a directive of the configuration policy measuring the virtual machine monitor used to launch and monitor the virtual machine to obtain a metric of the virtual machine monitor, and extending virtual platform configuration registers of the virtual trusted platform module with the obtained metric of the virtual machine monitor.

7. The machine readable medium of claim 1 wherein the hash value and version number are provisioned to the non-volatile storage by an entity that generates the configuration policy.

8. The machine readable medium of claim 1 wherein the plurality of instructions, in response to being executed, further result in the computing device, in response to determining that the configuration policy is not trusted or is not current, refusing to launch the virtual machine.

9. The machine readable medium of claim 1 wherein the plurality of instructions, in response to being executed, further result in the computing device, in response to determining that the configuration policy is not trusted or is not current, launching the virtual machine in a safe mode.

10. A method comprising launching a virtual machine monitor, determining, with the virtual machine monitor, whether a configuration policy that defines a configuration for a virtual trusted platform module is trusted and current, including retrieving a hash value of the configuration policy from non-volatile storage of a hardware trusted platform module, computing a hash value of the configuration policy, and determining that the configuration policy is trusted in response to the retrieved hash value corresponding to the computed hash value, retrieving from the non-volatile storage a version number for the configuration policy, and determining that the configuration policy is current in response to the retrieved version number matching a version number of the configuration policy, the version number unique from version numbers of previous configuration policies, configuring the virtual trusted platform module per the configuration policy in response to the virtual machine monitor determining that the configuration policy is trusted and current, and launching, via the virtual machine monitor, a virtual machine associated with the virtual trusted platform module.

11. The method of claim 10 further comprising retrieving, from the non-volatile storage, a hash value for a public key that corresponds to a trusted private key, and determining to trust the configuration policy in response to determining based upon the retrieved hash value and the public key that the configuration policy was signed using the trusted private key.

12. The method of claim 10 further comprising setting, per the configuration policy, a virtual platform configuration register of the virtual trusted platform module to a value specified by the configuration policy.

13. The method of claim 10 further comprising copying, per the configuration policy, a value from a platform configuration register of a hardware trusted platform module to a virtual platform configuration register of the virtual trusted platform module.

14. A computing device, comprising a hardware trusted platform module comprising non-volatile storage, a processor to execute instructions, and a non-transitory machine readable storage medium comprising a plurality of instructions that, in response to being executed, result in the processor;

determining based upon data stored in the non-volatile storage of the hardware trusted platform module whether a configuration policy for a virtual trusted platform module associated with a virtual machine is trusted and current, wherein the determining includes retrieving a hash value of the configuration policy from said non-volatile storage, computing a hash value of the configuration policy, and determining that the configuration policy is trusted in response to the retrieved hash value corresponding to the computed hash value, retrieving from said non-volatile storage a version number for the configuration policy, and determining that the configuration policy is current in response to determining that the retrieved version number matches a version number of the configuration policy, the version number unique from version numbers of previous configuration policies, setting virtual platform configuration register values of the virtual trusted platform module per directives of the configuration policy in response to determining that the configuration policy is trusted and current; and launching, via a virtual machine monitor, the virtual machine associated with said virtual trusted platform module.

15. The computing device of claim 14, wherein the plurality of instructions in response to being executed further result in the processor retrieving, from the non-volatile storage of the hardware trusted platform module, a public key that corresponds to a trusted private key, and determining to trust the configuration policy in response to determining based upon the retrieved public key that the configuration policy was signed using the trusted private key.

16. The computing device of claim 14, wherein the plurality of instructions in response to being executed further result in the processor retrieving, from the non-volatile storage of the hardware trusted platform module, a hash value of a public key that corresponds to a trusted private key, authenticating the public key by comparing a computed hash value of the public key with the hash value retrieved from the non-volatile storage, and determining to trust the configuration policy in response to determining based upon the authenticated public key that the configuration policy was signed using the trusted private key.

17. The computing device of claim 14 wherein the plurality of instructions, in response to being executed, further result in the processor, in response to determining that the configuration policy is not trusted or is not current, refusing to launch the virtual machine.

18. The computing device of claim 14 wherein the plurality of instructions, in response to being executed, further result in the processor, in response to determining that the configuration policy is not trusted or is not current, launching the virtual machine in a safe mode.

* * * * *